Sept. 23, 1958  J. W. ALLEN  2,852,924
DRIVE JOINT
Filed Sept. 12, 1957  2 Sheets-Sheet 1
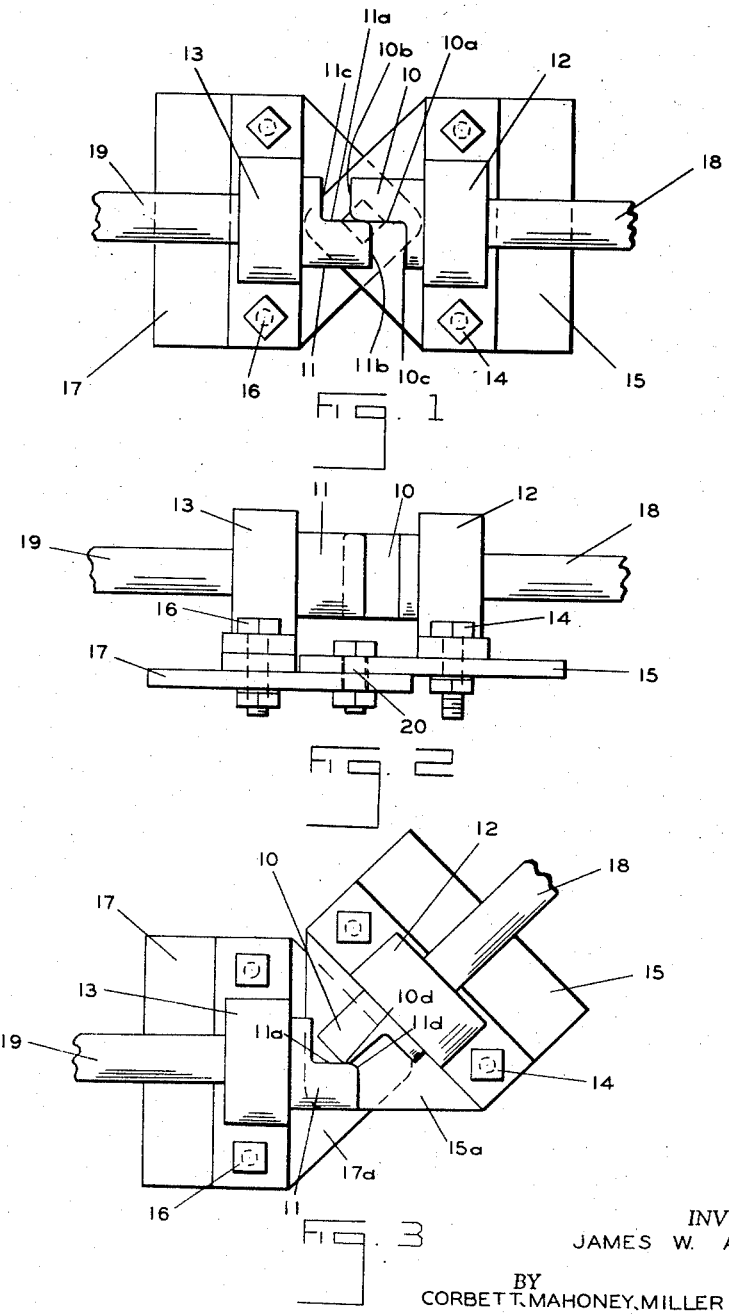
INVENTOR.
JAMES W. ALLEN
BY
CORBETT, MAHONEY, MILLER & RAMBO
BY
ATT'YS.

Sept. 23, 1958  J. W. ALLEN  2,852,924
DRIVE JOINT
Filed Sept. 12, 1957  2 Sheets-Sheet 2
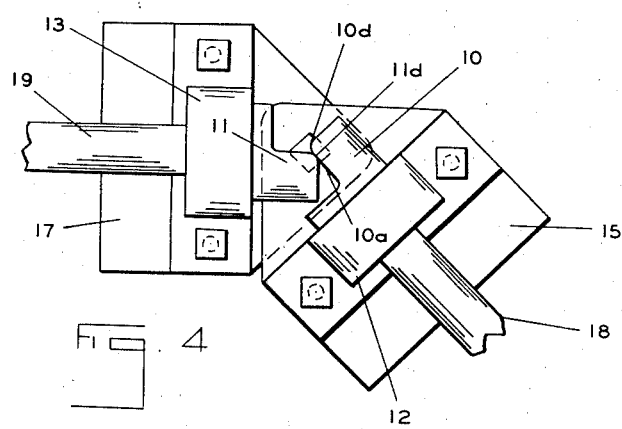
Fig. 4
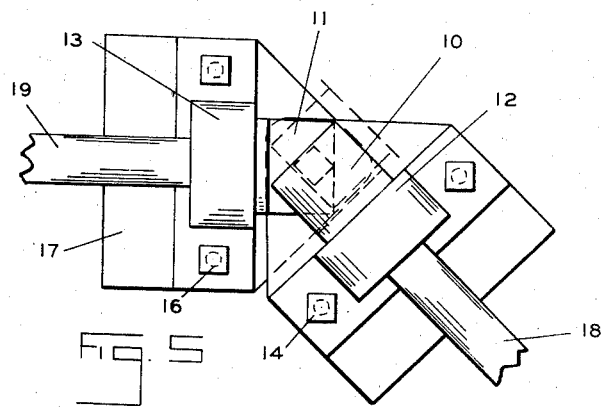
Fig. 5
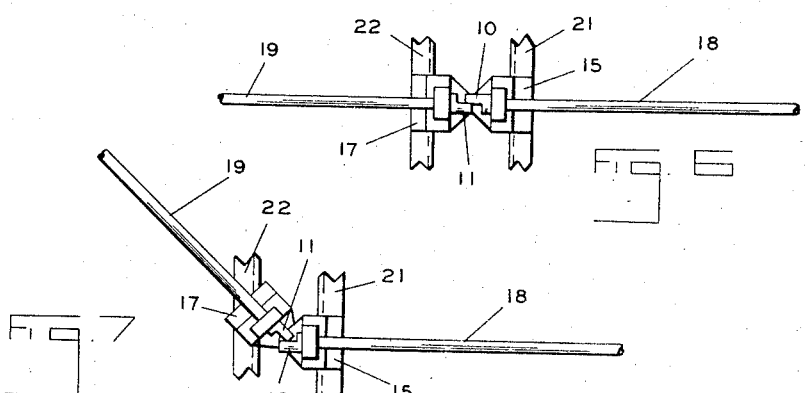
Fig. 6
Fig. 7
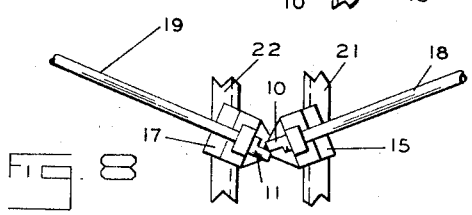
Fig. 8
INVENTOR.
JAMES W. ALLEN
BY
CORBETT, MAHONEY, MILLER & RAMBO
BY                     ATT'YS.

United States Patent Office 2,852,924
Patented Sept. 23, 1958

2,852,924

DRIVE JOINT

James W. Allen, Columbus, Ohio

Application September 12, 1957, Serial No. 683,620

7 Claims. (Cl. 64—6)

My invention relates to a drive joint. It has to do, more specifically, with a drive joint which can be located between a driving and a driven shaft and is of such a nature as to permit the shafts to be disposed at a selected angle relative to each other.

The drive joint of my invention is very simple and inexpensive and is designed to take the place of an expensive universal joint for certain applications. According to my invention, the joint consists of a driving member and a driven member which are not actually connected together. These members are provided with flat contact surfaces which extend from opposite directions into overlapping relationship with each other. If the driving and driven members are in axial alignment, the flat faces thereof will contact and the face of the driving member will drive against the face of the driven member. The driving and driven members are angularly adjustable relative to each other so as to relatively displace their axes. Whenever so displaced, the outer edge or outer corner of one member will contact with the face of the other member and the edge will be displaced angularly relative to the flat face during the simultaneous rotation of the two members.

The preferred embodiment of my invention is illustrated in the accompanying drawings.

In these drawings:

Figure 1 is a plan view of the drive joint showing the driving and driven members in axial alignment.

Figure 2 is a side elevational view of the drive joint in the condition shown in Figure 1.

Figure 3 is a plan view similar to Figure 1 but showing the driving and driven members of the joint adjusted to one extreme angular relationship.

Figure 4 is a view similar to Figure 3 but showing the driving and driven members adjusted to the opposite extreme angular relationship.

Figure 5 is a view similar to Figure 4 but showing the driving and driven members rotated 90° to give a plan view of the contacting portions of the two members.

Figure 6 is a diagrammatic view illustrating the use of the drive joint in a straight line drive.

Figure 7 is a similar view illustrating one example of the use of the drive joint with the shafts in angular relationship.

Figure 8 is a similar view illustrating the shafts in a different angular relationship.

With reference to the drawings, and particularly to Figures 1 and 2, I have illustrated my drive joint as comprising a rotatable member 10 and a rotatable member 11. One of these members is the driving member and the other is the driven member. For purpose of explanation, I will refer to the member 10 as the driving member and the member 11 as the driven member.

The member 10 is rotatably disposed in a bearing 12 which may be of any suitable antifriction type. The member 11 is similarly disposed in a bearing 13. The bearing 12 is bolted by bolts 14 to a supporting plate 15. The bearing 13 is bolted by bolts 16 to a supporting plate 17. The driving member 10 is suitably non-rotatably connected to a driving shaft 18 whereas the driven member 11 is suitably non-rotatably connected to a driven shaft 19. The members 10 and 11 are shaped to provide the flat contact faces 10a and 11a and the transverse shoulders 10c and 11c which are respectively at an angle to each other, preferably a right angle. The faces 10a and 11a extend from opposite directions into overlapping relationship when they are axially aligned, as shown in Figure 1, the contact being at a plane extending through the axes of the members. Each flat face 10a and 11a is in the plane of the axis of that particular member and extends from the inner transverse shoulder 10c or 11c, respectively, to the outer end 10b or 11b, the end being at an angle to the flat surface, preferably at a right angle. It will further be noted from Figure 1 that the outer end 10b of the member 10 is spaced from the flat transverse shoulder 11c of the member 11 and that the outer end 11b of the member 11 is spaced from the flat transverse shoulder 10c of the member 10.

The supporting plates 15 and 17 are provided with pointed inner ends 15a and 17a which extend from opposite directions into overlapping relationship and are pivotally connected together by a pivot bolt 20. The axis of this pivot bolt 20 intersects the plane of contact of the flat faces 10a and 11a and is located midway axially of the flat contacting areas of the surfaces 10a and 11a when the members 10 and 11 are axially aligned, as shown in Figure 1.

As previously indicated, when the members 10 and 11 are in axial alignment, as shown in Figure 1, the flat surface 10a drives against the flat surface 11a. In any other angular relationship of these members, the contact will be between the outer corner or edge of one member and the flat face of the other member depending upon the direction of angular displacement. Therefore, each of these corners is rounded as indicated at 10d and 11d. In Figure 3, the members 10 and 11 are shown disposed in angular relationship, this being an extreme angular displacement in one direction. The corner 10d of the driving member 10 will drive against the flat face 11a of the driven member 11. In the extreme angular relationship in the other direction shown in Figure 4, the flat face 10a of the member 10 will drive against the corner 11d of the member 11. From these figures, the reason for spacing the outer ends 10b and 11b of the members 10 and 11 from the associated transverse surfaces 11c and 10c is apparent, this purpose being to prevent interference of the end of one member with the other member. Thus, whenever the members 10 and 11 are displaced axially, the drive contact is between the corner of one member and the flat surface of the other. As the members rotate together, this line of contact of the corner with the flat face will shift angularly as is evident from Figure 5 which indicates by the dotted line X the other extreme position of the line of contact relative to the contact position shown by full lines. In other words, the contact will be changing throughout an X-shaped area on the flat face of the member with which the rounded corner of the other member contacts during the simultaneous rotation of the two members.

In Figures 6, 7, and 8, I have illustrated the use of this drive joint with the driving shaft 18 and the driven shaft 19 in different angular positions relative. In the example shown in Figure 6, the driving shaft 18 is axially aligned with the driven shaft 19 and the flat face of the driving member 10 contacts with the associated flat face of the driven member 11. The plates 15 and 17 may be welded to supports 21 and 22 so that the shafts will be held in predetermined relationship. In the example shown in Figure 7, the shafts 18 and 19 are at an extreme angular position, the shaft 19 being shifted approximately 45° from axial alignment which is the practical maximum displacement of the members 10 and 11 from axial alignment. The example of Figure 8 is similar except that both shafts 18 and 19 have been shifted half the maximum angle from axial alignment which is substantially 22½° for each. In each instance of maximum angular displacement to approximately 45°, the included angle between the shafts will be 135°.

It will be apparent from the above description that I have provided a drive joint which is extremely simple and inexpensive and which can be used to replace expensive universal joints for certain applications.

Various other advantages will be apparent.

Having thus described my invention, what I claim is:

1. An angularly adjustable drive joint comprising a rotatable driving member and a rotatable driven member, each of said members having a single flat face and being so disposed relatively that the faces thereof extend over each other from opposite directions so that the driving engagement between the two members will be at the flat face only of at least one of said members, each flat face being in the plane of the axis of that member on which it is provided, said rotatable members being relatively angularly adjustable to angularly displace the axes thereof about a single pivot axis which extends transversely of and substantially through the planes of said faces and intersects the axes of said members.

2. A drive joint according to claim 1 in which the flat surfaces are disposed between an inner transverse shoulder at an angle thereto and an outer end at an angle thereto.

3. A drive joint according to claim 2 in which each corner between the flat face and the angularly disposed outer end of each member is rounded.

4. A drive joint according to claim 3 comprising a support for rotatably supporting each member, and means for pivoting said supports together for relative angular adjustment.

5. A drive joint according to claim 4 in which the flat surfaces, when the members are in alignment, extend into overlapping relationship with each other.

6. A drive joint according to claim 5 in which the outer end of each member is spaced from the transverse shoulder on the other member.

7. A drive joint according to claim 5 in which the pivot axis passes through the plane of contact of said flat surfaces when the members are in axial alignment substantially midway of the extent of the overlapping areas thereof.

References Cited in the file of this patent

UNITED STATES PATENTS

| | | |
|---|---|---|
| 1,008,317 | Fink | Nov. 14, 1911 |
| 1,429,980 | Spangler | Sept. 26, 1922 |
| 1,643,353 | Stiefel | Sept. 27, 1927 |
| 2,388,456 | Wildhaber | Nov. 6, 1945 |

FOREIGN PATENTS

| | | |
|---|---|---|
| 265,998 | Germany | Oct. 17, 1913 |